United States Patent [19]

Buschulte

[11] Patent Number: 5,380,117
[45] Date of Patent: Jan. 10, 1995

[54] APPARATUS FOR THE DETACHABLE COUPLING OF GRIPPING DEVICES OR CORRESPONDING TOOLS ON ROBOT ARMS

[76] Inventor: Joachim Buschulte, Schwarze Ewaldstrasse 20, 4600 Dortmund 41, Germany

[21] Appl. No.: 99,769

[22] Filed: Jul. 30, 1993

Related U.S. Application Data

[63] Continuation of Ser. No. 635,187, Jan. 4, 1991, abandoned.

[30] Foreign Application Priority Data

Jun. 16, 1989 [DE] Germany .................. 8907348[U]

[51] Int. Cl.⁶ .................................................. B25G 3/20
[52] U.S. Cl. .................................... 403/323; 403/379; 403/361; 403/354; 901/29; 279/77
[58] Field of Search .............. 403/321, 323, 324, 348, 403/350, 354–356, 379, 360–361, 154, 265; 901/28–29, 41; 414/736; 483/31–32; 279/77, 81, 97; 81/436

[56] References Cited

U.S. PATENT DOCUMENTS

| 1,262,185 | 4/1918 | Drew | 279/97 X |
|---|---|---|---|
| 2,201,638 | 5/1940 | Theibault, Sr. | 403/379 X |
| 2,433,127 | 12/1947 | Kinzbach | 279/77 |
| 2,724,770 | 11/1955 | Onksen, Jr. | 403/372 X |
| 2,781,199 | 2/1957 | Veldhuizen | 279/77 |
| 2,816,770 | 12/1957 | De Vlieg et al. | 279/77 X |
| 3,881,334 | 5/1975 | Wilson | 403/323 X |
| 4,191,228 | 3/1980 | Fenton | 81/436 |
| 4,639,029 | 1/1987 | Kolonia | 403/265 |
| 4,832,546 | 5/1989 | Potemkin | 279/97 X |
| 5,114,264 | 5/1992 | Barlow | 403/379 X |

FOREIGN PATENT DOCUMENTS

| 72525 | 1/1953 | Netherlands | 403/321 |
|---|---|---|---|
| 748064 | 7/1980 | U.S.S.R. | 403/323 |

*Primary Examiner*—Randolph A. Reese
*Assistant Examiner*—Harry C. Kim
*Attorney, Agent, or Firm*—Anderson Kill Olick & Oshinsky

[57] ABSTRACT

An apparatus for the detachable coupling, particularly of gripping devices or corresponding tools on robot arms or the like, is disclosed. The apparatus generally comprises two flange elements fastenable at the gripping device and robot arm, a receiving recess on one of the flange elements and an engagement element on the other, wherein the engagement element is inserted into the recess and one of the flange elements is penetrated by a locking pin in the locking position.

9 Claims, 2 Drawing Sheets

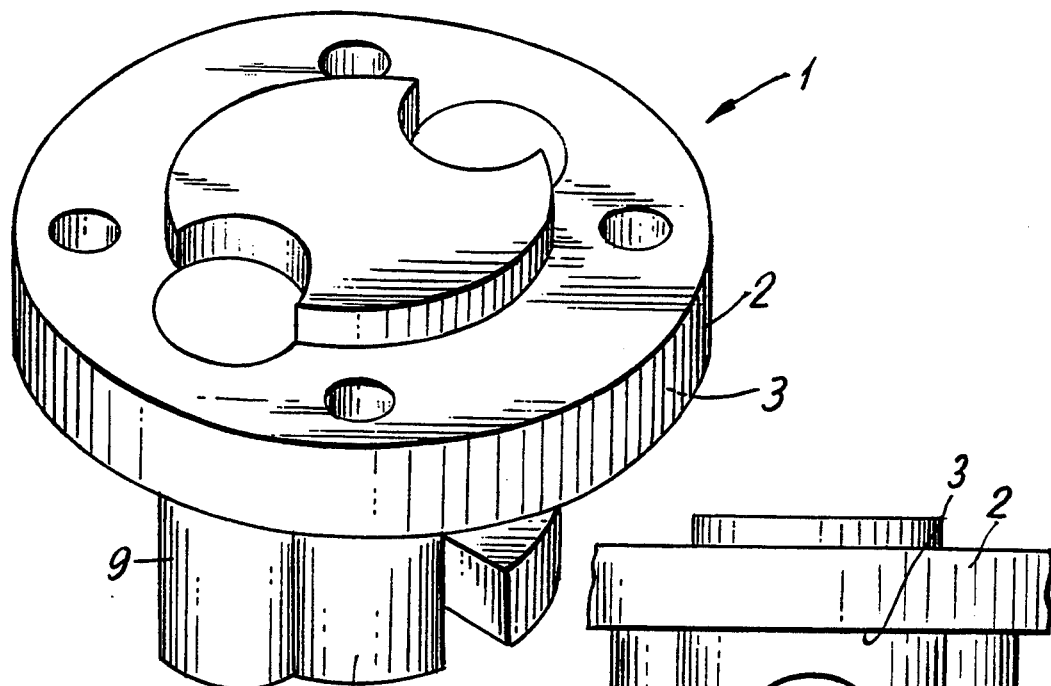
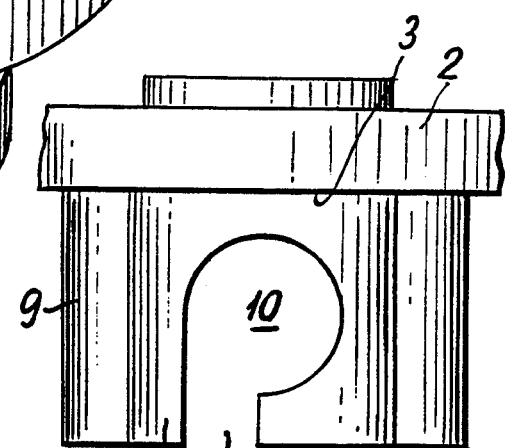
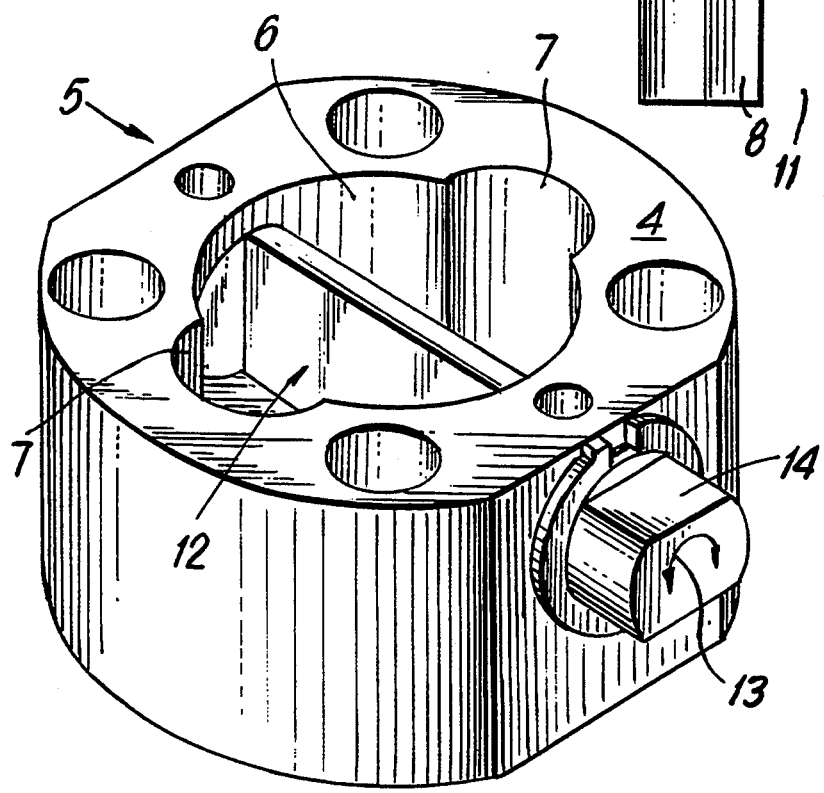

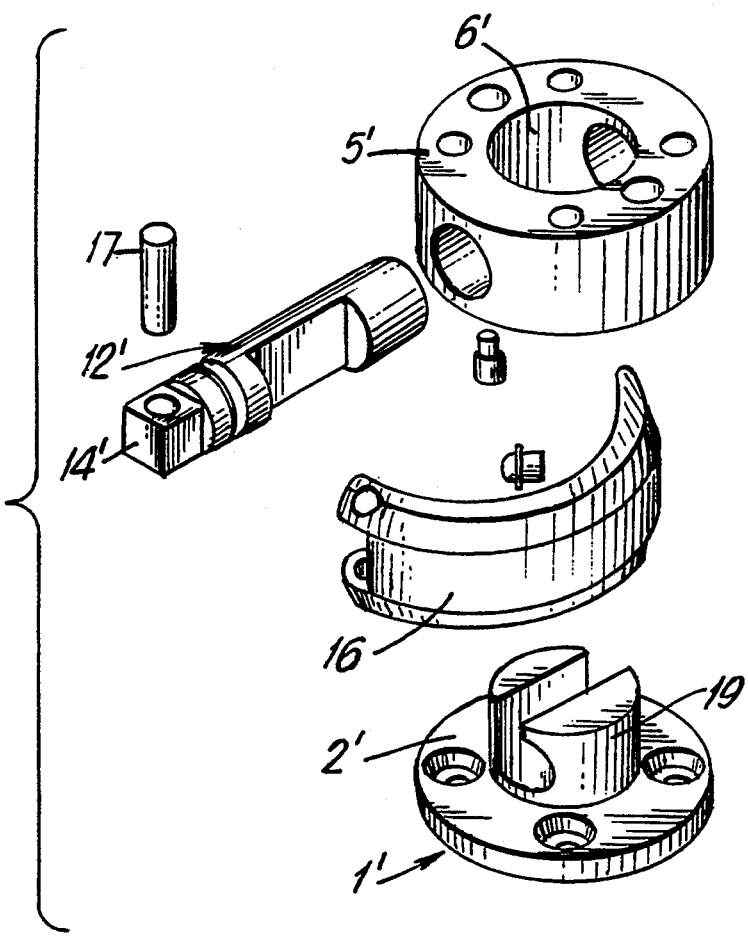
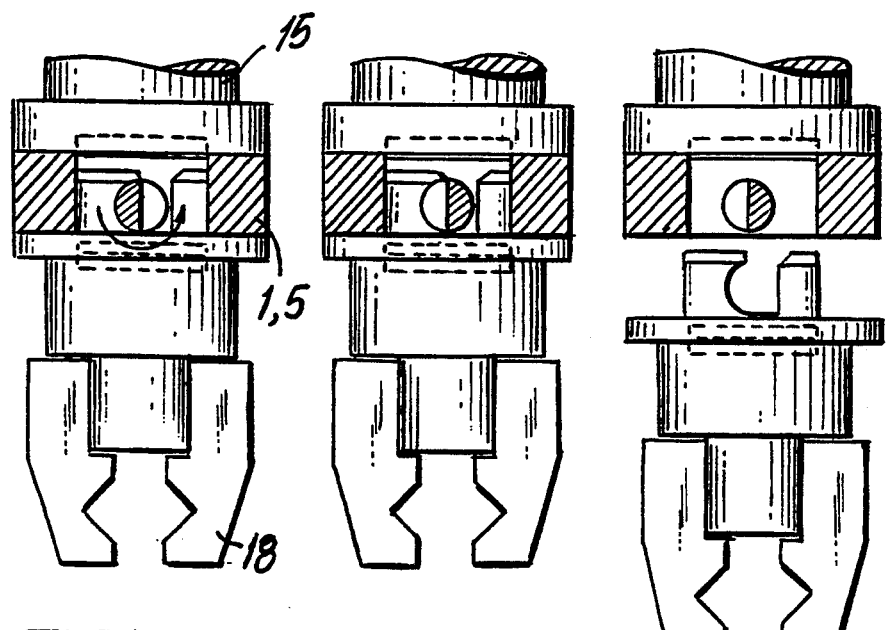

APPARATUS FOR THE DETACHABLE COUPLING OF GRIPPING DEVICES OR CORRESPONDING TOOLS ON ROBOT ARMS

This is a continuation of application Ser. No. 07/635,187 filed Jan. 4, 1991, now abandoned.

FIELD OF THE INVENTION

The present invention is directed to coupling devices and more particularly to an apparatus for the detachable coupling of gripping devices or corresponding tools on robot arms—or the like.

BACKGROUND OF THE INVENTION

Costly flange constructions for changing tools such as gripping devices or the like at robot arms are known e.g. from EP 0 139 978 and DE-OS 36 33 357. At present, the manual changing of gripping devices and tools is generally characterized by screw connections on flanges having a more or less exact fit, which is not the case e.g. with chip removing tools, known per se. A certain simplification has been brought about in this instance by the introduction of DIN 24601 (handling devices and industrial robots; mechanical interface, round). Known automatic changing devices are comparatively costly. The constructions are also so cost-intensive that they are only profitable when frequent changing of tools is necessary. Conversely, in non-automatic devices the frequent changing of tools is countered by the comparatively long set-up time required with these solutions.

An additional problem consists in that the mechanical interface must withstand high dynamic loading. It must be constructed with a very accurate fit so as not to impair the precision of the robot.

Therefore, the object of the present invention is to provide a solution for providing a changing apparatus for gripping devices or the like at robot arms which is simple to produce, can withstand high loads, and is also precise.

SUMMARY OF THE INVENTION

Such an apparatus for meeting this object is characterized, according to the invention, in that it is formed from two flange elements which are fastenable at the gripping device and robot arm, respectively, wherein one flange element comprises a receiving recess and the other flange element comprises an engagement element corresponding to the latter, wherein the engagement element, which is inserted into the recess, and the corresponding flange part is penetrated by a locking pin in the locking position.

As is known, flange parts can be manufactured comparatively simply, receiving recesses and engagement elements can be manufactured with high precision and accordingly so as to be practically free of play; similarly, the locking pin is to be supported so as to be free of play and simple to manipulate.

The construction of the invention provides that the engagement element is equipped with an overlapping groove for overlapping the locking pin in the assembly position.

Accordingly, it is possible for the locking pin to be left always in one flange part; the other flange part can then be lifted out in the unlocking position thanks to the overlapping groove, so that it is possible to change the gripping device.

The invention also provides that the overlapping groove ends in a substantially widened cylindrical bore hole, wherein the locking pin is constructed as a semi-cylinder element for swiveling into the bore hole so as to lock, wherein it can also be provided in particular that the cylindrical bore hole is arranged in the locking position so as to be slightly eccentric relative to the semicylinder element of the locking pin in order to apply a clamping force when locking.

A simple fast locking and unlocking is accordingly made possible while maintaining an optimal snug fit. An uncomplicated changing of gripping devices, tools or the like improves the usability of a robot equipped with this way. If the gripping devices develop worn parts, the latter can be exchanged simply and quickly without having to carry out time-consuming exchanging work on this structural component assembly, which can lead to heavy production losses.

The invention also provides that the locking pin comprises a handling projection facing outward and/or an auxiliary hand lever. In a simple manner, the handling projection provides a "manual changing system" which can be easily actuated e.g. by means of a corresponding wrench or directly by means of the auxiliary hand lever. Automatic clamping means generally require auxiliary energy such as pneumatic or hydraulic devices, inserting and centering means and the like. The present invention circumvents this.

In order to be able to absorb particularly high forces the invention also provides that the engagement element is constructed so as to be substantially cylindrical in cross section and the receiving recess in the corresponding flange part is constructed as a cylindrical bore hole, wherein it is provided in particular that the engagement element is constructed with at least two contour areas which overlap the cylindrical outer contour on the outside, and the bore hole is constructed with corresponding recesses and/or that the areas overlapping the cylinder contour on the outside are constructed as a semicylinder and the corresponding recesses in the corresponding element are constructed as a cylindrical bore hole.

BRIEF DESCRIPTION OF THE DRAWINGS

Other features, details and advantages of the invention follow from the other subclaims and by means of the following description by means of the drawings of which:

FIG. 1 shows a spatial simplified view of a flange part;

FIG. 2 shows the spatially simplified view of the corresponding flange part;

FIG. 3 shows a side view of the first flange part according to arrow III in FIG. 1;

FIG. 4 shows an exploded view of a modified embodiment example of the flange element, according to the invention, with auxiliary hand lever;

FIG. 5 shows three positions between robot and gripping device.

DETAILED DESCRIPTION OF THE PREFERRED EMBODIMENT

Referring now to the drawings, wherein like numerals reflect like elements throughout the several views, FIG. 1 shows a first flange element, designated in general by 1, of an Apparatus for the Detachable Coupling of Gripping Devices or Corresponding Tools on Robot Arms, comprising an upper support shoulder 2 with a lower support surface 3 which is supported, in the locking position, on the upper support surface 4 of the other flange element so as to fit exactly, the latter being shown in FIG. 2 and designated in general by 5. The flange element 1 and the lower flange element 5, respectively, comprise assembly bore holes for fastening at the respective gripping devices or robot arms 15 which are shown suggestively in FIG. 5.

The flange element 5 shown at bottom comprises an inner receiving recess 6, which is constructed so as to be substantially circular in cross section, with two semicircular additional recesses 7 overlapping the outer contour, as is shown in FIG. 2. The flange element 1 shown at the top fits together with the latter in a positive-locking manner in that it comprises a centric engagement element 8 having the contour areas 9 as semicylinders, which contour areas 9 overlap the circular outer contour on the outside. In the locking position, the contour areas 9 engage in the semicircular additional recesses 7 in the corresponding flange element 5.

The engagement element 8 is penetrated vertically by a cylindrical bore hole 10 with an overlapping groove 11 facing the free lower side, while the other flange element 5 comprises a locking pin 12 which is supported at the latter so as to be rotatable (arrow 13).

The locking pin 12 is constructed as a semicylinder, wherein the open width of the overlapping groove 11 is selected in such a way that it can completely overlap the semicylinder in the corresponding position of the locking pin 12. It is noted that the locking pin 12 is shown in FIG. 2 in the locking position, it would have to be swiveled to the left by 180° according to arrow 13 for the other flange element 1 to be locked over.

The centric bore hole 10 can be arranged slightly eccentrically relative to the locking pin 12 in such a way that the pin semicylinder is pressed in the bore hole 10 when locking, so that the lower supporting surface 3 at the flange 2 is pressed securely on the supporting surface 4 and flange element 5. As a result, there is both an axial and a radial clamping.

As follows from FIG. 2, the locking pin 12 comprises a handling projection 14 which can be engaged, e.g. by a wrench, in order to actuate the locking pin.

FIG. 4 shows a somewhat modified embodiment example. The elements are designated by the same reference numbers, but with the addition of the symbol '. In FIG. 4, the flange element 6', which is fastened at the robot arm 15, is shown at the top with the half-pin 12'. The half-pin 12' is provided at its handling projection 14' in this instance with an auxiliary handle lever 16 which is fastened at the latter with a swivel pin 17. The auxiliary hand lever can be swiveled on to the outer contour of the flange 5' when not in use and is accordingly accommodated in a space-saving manner. If it is needed, it is swiveled out and the half-pin 12' can be swiveled by means of it.

The three positions, locking, unlocking and the separated position, are shown in FIG. 5; the robot arm is shown in a suggestive manner and is designated by 15; the corresponding gripping tool is designated by 18.

At least one of the flange parts 2' or 6' can be provided on one of the contact surfaces with a coating of elastic work material; this is suggested by dashes in FIG. 4; such a coating is designated by 19. Certain tolerances can accordingly be compensated for, i.e. the original manufacturing does not require extreme accuracy in the tolerance area; the elastic coating ensures the corresponding compensation. Moreover, a play adjusting element, not shown in more detail, e.g. a swivel nut with a corresponding fine thread, can also be provided.

Of course, the described embodiment example of the invention can be modified in many respects without departing from the basic idea. For example, the areas 9, which overlap the main contour, and the corresponding recesses 7 can also be constructed as a plurality of elongated grooves and springs; wedge surfaces can be additionally provided for a more secure clamping of the elements at one another, as well as an oval constant-diameter contour or the like. It is expressly noted that the flange elements can, of course, be integral component parts of the gripping devices and robot arms, respectively, i.e. they need not necessarily be constructed as separate structural component parts. The invention can also be used in the connection of other elements than those described here, e.g. also in conventional machine tools.

While the preferred embodiment of the invention has been depicted in detail, various modifications and adaptations may be made thereto without departing from the spirit and scope of the invention, as delineated in the following claims.

I claim:

1. An apparatus for detachably coupling one of a gripping device and a corresponding tool on a robot arm, said apparatus comprising:

a first flange element fastenable to the one of a gripping device and a corresponding tool, said first flange element having a lower plane support surface and an engagement element extending from said lower support surface;

a second flange element fastenable to the robot arm, said second flange element having a recess for receiving said engagement element of said first flange element in a coupled position of the one of a gripping device and a corresponding tool on the robot arm, and an upper plane support surface, which is being abutted by said lower plane support surface of said first flange element in the coupled position;

a locking pin for penetrating said second flange element in the coupled position of the one of a gripping device and a corresponding tool on the robot arm;

wherein said engagement element has a groove for overlapping said locking pin in the coupled position, and a substantially widened cylindrical bore hole into which said overlapping groove passes;

wherein said cylindrical bore hole is arranged slightly eccentrically relative to said locking pin in the coupled position;

wherein said locking pin is formed as a semicylinder element for swiveling into said cylindrical bore hole in order to apply a clamping force for locking said first and second flange elements to each other; and wherein said locking pin is located substantially in an effective center of the robot arm in the coupled position.

2. The apparatus of claim 1, wherein the locking pin comprises a handling projection which faces outward.

3. The apparatus of claim 2, wherein the locking pin further comprises an auxiliary hand lever.

4. The apparatus of claim 1, wherein the engagement element is constructed to be substantially cylindrical in cross section and the receiving recess in the second flange element is constructed as a cylindrical bore hole.

5. The apparatus of claim 4, wherein the engagement element is constructed with at least two contour areas which overlap cylindrical outer contour on the outside, and the receiving recess is constructed with corresponding recesses.

6. The apparatus of claim 5, wherein said areas are constructed as semicylinders and the corresponding recesses in the second flange element are constructed as a semi-cylindrical bore hole.

7. The apparatus of claim 6, wherein the first flange element is equipped with a support shoulder in order to contact the corresponding support surface of the second flange element to fit exactly.

8. The apparatus of claim 1, wherein the locking pin comprises an auxiliary hand lever.

9. The apparatus as in any one of the preceding claims, wherein at least one of the flange elements is equipped with a means for compensating for play when the flange elements are in the coupled position.

* * * * *